United States Patent [19]
Raju et al.

[11] Patent Number: 6,078,999
[45] Date of Patent: Jun. 20, 2000

[54] RECOVERING FROM A FAILURE USING A TRANSACTION TABLE IN CONNECTION WITH SHADOW COPY TRANSACTION PROCESSING

[75] Inventors: Sitaram C. V. Raju; Kyle G. Peltonen, both of Issaquah, Wash.

[73] Assignee: Microsoft Corporation, Redmond, Wash.

[21] Appl. No.: 09/222,059

[22] Filed: Dec. 29, 1998

Related U.S. Application Data

[62] Division of application No. 08/785,820, Jan. 9, 1997, Pat. No. 6,035,379.

[51] Int. Cl.[7] .................................................. G06F 12/16
[52] U.S. Cl. .......................... 711/161; 711/155; 711/162; 707/202; 707/203; 707/204; 714/20
[58] Field of Search ..................................... 711/161, 162, 711/165, 173, 155; 714/20; 707/202, 203, 204

[56] References Cited

U.S. PATENT DOCUMENTS

| 4,949,251 | 8/1990 | Griffin et al. ......................... 709/101 R |
| 5,201,044 | 4/1993 | Frey, Jr. et al. .......................... 364/221 |
| 5,548,750 | 8/1996 | Larsson et al. ........................... 707/204 |
| 5,628,005 | 5/1997 | Hurvig ......................................... 707/8 |
| 5,796,934 | 8/1998 | Bhanot et al. ............................... 714/4 |
| 5,799,305 | 8/1998 | Bortvedt et al. .......................... 707/10 |

OTHER PUBLICATIONS

Brockschmidt, Kraig, "Inside OLE, 2nd Edition", 1995, Microsoft Press.

Custer, Helen, "Inside the Windows NT File System", 1994, Microsoft Press.

Gray, Jim and Reuter, Andreas, "Transaction Processing: Concepts and Techniques, Chapter Four: Transaction Models", pp. 159–235, 1993, Morgan Kaufman Publishers, Inc.

Gray, Jim and Reuter, Andreas, "Transaction Processing: Concepts and Techniques, Chapter Nine: Log Manager", pp. 493–525, 1993, Morgan Kaufmann Publishers, Inc.

Gray, Jim and Reuter, Andreas, "Transaction Processing: Concepts and Techniques, Chapter Ten: Transaction Manager Concepts", pp. 529–582, 1993, Morgan Kaufmann Publishers, Inc.

Gray, Jim and Reuter, Andreas, "Transaction Processing: Concepts and Techniques, Chapter Eleven: Transaction Manager Structure", pp. 585–628, 1993, Morgan Kaufmann Publishers, Inc.

Gray, Jim and Reuter, Andreas, "Transaction Processing: Concepts and Techniques, Chapter Twelve: Advanced Transaction Manager Topics", pp. 5631–5657, 1993, Morgan Kaufmann Publishers, Inc.

*Primary Examiner*—Hiep T. Nguyen
*Attorney, Agent, or Firm*—Workman, Nydegger & Seeley

[57] ABSTRACT

A system for performing transaction processing on user data maintains a transaction table. The transaction table holds the identities of structured storages that have been opened but not yet closed by each of the transactions that are accessing the structured storages. Each time that a stream holding user data is opened in a write mode, an internal copy of the stream is made. Changes are applied to the internal copy. At commit time, the following metadata operations are performed as a single atomic transaction. Each copy is renamed to have the name of the original stream. If no other transactions are accessing the stream, the original stream is deleted. However, if other transactions are accessing the stream, the original stream is renamed to have the name of the copy. The metadata transaction is implemented with write-ahead logging. Upon recovery from a system failure, any metadata transaction that was in progress at the time of the failure is undone. Then the transaction table is read to identify each of the structured storages that must be opened and processed to remove any remaining internal copies of streams. In summary, the system provides robust multiuser transacted access to user data through file system metadata transactions and uses a transaction table to optimize system recovery.

29 Claims, 17 Drawing Sheets

RECOVERING FROM A FAILURE USING A TRANSACTION TABLE IN CONNECTION WITH SHADOW COPY TRANSACTION PROCESSING

RELATED APPLICATIONS

This application is a divisional of U.S. patent application Ser. No. 08/785,820, filed on Jan. 9, 1997, now U.S. Pat. No. 6,035,379 entitled "Transaction Processing for User Data Employing Both Logging and Shadow Copying," which is incorporated herein by reference.

BACKGROUND OF THE INVENTION

1. The Field of the Invention

The present invention relates generally to computer systems and, more particularly, to transaction processing of user data.

2. The Prior State of the Art

In transaction processing, a "transaction" is a logical unit of work that is to be atomically performed. For example, a transfer of funds between bank accounts constitutes a single transaction that entails the two operations of debiting from one account and crediting the other account. Transaction processing guarantees that if a transaction executes some updates and then a failure occurs before normal termination is reached, the updates are undone. A transaction either executes in its entirety or is totally canceled. Thus, in the transfer of funds example, either both the crediting and debiting occur or both are canceled. Most transaction systems employ a commit function and a rollback function to realize the, desired "all or nothing" behavior. The commit function signals the successful end of a transaction and commits all updates to make the updates permanent (generally this means that the changes are reflected in persistent storage). The rollback function signals an unsuccessful end of transaction where something has gone wrong and the updates must be rolled back or undone to return to the state before the transaction began.

Two commonly used approaches to transaction processing are write-ahead logging and shadow copying. With write-ahead logging, a log of operations is maintained, and the log is used to recover committed operations should a failure occur. With shadow copying, a backup or shadow copy of the item being altered by the operations in a transaction is made. At commit time, the shadow copy of the item replaces the original copy of the item. These two approaches to transaction processing will be described in more detail below relative to two exemplary implementations of them.

Microsoft® OLE supports a transacted access mode for objects. In order to gain a better understanding of how Microsoft® OLE implements this transacted access mode, it is helpful to review some of the concepts employed by Microsoft® OLE. Microsoft® OLE supports the use of objects, where an object is a logical structure that encapsulates both data and behavior. An object is a logical structure that includes both data structures for holding data and program code for functions that operate on the data held within the data structures.

Microsoft® OLE supports the use of interfaces. An interface, in this context, is a named set of logically related functions. Each interface lists signatures for a set of functions but does not provide code for implementing the functions of interfaces. Object classes are the parties that are responsible for providing code for implementing functions.

An object is an instantiation of an object class. When an object class provides code for implementing the functions in an interface, the object class is said to "support" the interface. The code provided by the object class that supports the interface must comply with the signatures that are specified within the interface.

Microsoft® OLE defines a structured storage model. This model specifies how date is saved and retrieved from storage. Microsoft® OLE provides storage related interfaces that enable a file system to be stored within a single file. A "structured storage" under this model is a structured collection of objects, in the form of storages and streams. Each storage supports the IStorage interface, and each stream supports the IStream interface. These interfaces are defined as a standard part of Microsoft® OLE. Streams are logically equivalent to files in conventional systems and storages are logically equivalent to directories in conventional systems. A stream is the basic file system component where a linear sequence of data is stored. A storage can contain any number of other storages and streams. User defined data is not stored directly in the storages but rather is stored within streams contained therein. FIG. 1 is a block diagram that illustrates an example of the logical organization of a structured storage. In the example depicted in FIG. 1, a storage 10 includes storages 12 and 14. The storage 12, in turn, includes a stream 16 and the storage 14 includes streams 18 and 20.

Microsoft® OLE applies transaction processing to storages. Each storage can be opened in a direct access mode or in a transacted access mode. In the direct access mode, changes to storage objects are committed immediately with no chance of undoing the changes. In transacted access mode, however, the storage is opened in a buffered state whereby changes are saved to temporary files until they are committed (i.e., a shadow copy of the storage is used to hold the changes until the transaction is committed). It should be appreciated that this implementation is the default implementation of the IStorage interface that is part of Microsoft® OLE.

FIG. 2 is a flowchart that shows the steps that are performed in such transaction processing for storage in Microsoft® OLE. For each transaction, a copy of the structured storage is made (step 22 in FIG. 2). When the transaction is completed and ready to be committed, the shadow copy of the structured storage is flushed to disk (step 24 in FIG. 2). As mentioned above, each storage supports the IStorage interface. This interface includes a Commit( ) function that commits any changes that have been made to the storage since it was opened or last committed to persistent storage (i.e., disk). The Commit( ) function is called to flush the shadow copy of the structured storage to disk in step 24. The IStorage interface also provides a Revert( ) function that discards all changes that have been made to the storage since the storage was opened or last committed. In order to complete the process of updating the storage, the shadow copy of the structured storage is renamed to the name of the original structured storage (step 26 in FIG. 2). After this renaming, the original structured storage is deleted (step 28 in FIG. 2). The deletion of the original structured storage frees up resources (such as memory or disk space) for other uses.

Although the shadow copying scheme facilitates transaction processing in an easily implemented manner, shadow copying requires a great deal of storage space. In particular, storage space must be allocated for the copy of the structured storage, which doubles the amount of storage space used. In addition, making the shadow copy requires additional time.

NTFS is a file system for the Microsoft® Windows® NT operating system. NTFS supports a write-ahead logging approach to transaction processing for metadata. Metadata is, data that describes other data such as objects or files. Metadata is typically contrasted with user data. For example, data describing a word processing document constitutes metadata, whereas data that forms the contents of the document constitutes user data.

In NTFS, operations that are part of a transaction which alters metadata are recorded in a log file before they are carried through on disk. As a result, if the system crashes while certain transactions are underway, partially completed transactions can be redone or undone when the system comes back online by consulting the log file. FIG. 3 depicts the format of the log file 30. The log file 30 is divided into two areas: the restart area 32 and the logging area 34. The restart area 32 stores context information, such as the location in the logging area at which NTFS should begin to read during recover after a system failure. The logging area 34 contains transaction records that may include update records. For the example format depicted in FIG. 3, the logging area 34 contains a sequence of update records 36. Update records 36 are stored in the logging area 34 for each of the operations in a transaction. As shown in FIG. 4, each update record 36 includes undo information 38 and redo information 40 for the associated operation. The undo information 38 specifies how to reverse the operation, and the redo information 40 specifies how to reapply the operation. The use of the update records during recovery will be discussed in more detail below.

FIG. 5 is a flowchart that shows the steps that are performed to log update records into the log file 30. The log file 30 is located in a persistent secondary storage, such as a disk storage. Initially, a transaction is logged by writing the update records for the operations of the transaction to the log file 30 (step 42 in FIG. 5). The associated operations of the transaction are then performed (step 44 in FIG. 5). When the transaction is committed, a log record indicating commitment of the transaction is added to the log file 30 (step 46 in FIG. 5).

As mentioned above, the log file 30 is used during recovery after a system failure. In particular, NTFS performs the steps shown in FIG. 6 during recovery. First, NTFS reads through the log file 30 and redoes each committed transaction (step 48 in FIG. 6). NTFS does this because it does not know whether the modifications were flushed to a disk in time before the failure, despite the transactions being committed. The update records 36 contain the redo information 40 for each operation of the committed transactions, and the redo information is used to redo the operations of the committed transactions. NTFS then locates all the transactions in the log file 30 that were not committed at the time of failure and undoes each of the operations for such transactions that were logged into the log file (step 50 in FIG. 6). The undo information 38 in the update records is used to undo the operations of the uncommitted transactions.

The major drawback with the write-ahead logging approach is that it requires a very complex implementation. Moreover, the log file may become a bottleneck because every update in every transaction involves writing to the same log file.

SUMMARY AND OBJECTS OF THE INVENTION

In accordance with a first aspect of the present invention, a computer system includes a file system for managing file system objects and supports transaction processing of user data stored in the file system objects. As part of a selected transaction, a file system object that holds user data is opened in write mode so that data may be written to the object. In response, a copy of at least a portion of the object is made and at least one change is applied to the copy as part of the selected transaction. Subsequently, in response to a request to commit the selected transaction, if no other transaction is accessing the object, the object is deleted and the copy is renamed to have the name of the object. The object rename operation and the delete operation are, in one embodiment, metadata transactions that are done at commit time as part of a single atomic transaction.

In accordance with another aspect of the present invention, a computer system provides a logical organization of objects that are partitioned into named partitions that include one or more objects holding user data. A data structure is provided for holding a list of partitions that have been opened by transactions. When a transaction opens a selected partition, the name of the selected partition is added to the data structure. In contrast, when a last close of a given partition occurs, the name of the given partition is removed from the data structure. When a system failure occurs and recovery is underway, the data structure is used to identify which of the partitions need to be examined to complete recovery.

In accordance with a further aspect of the present invention, a transaction table is provided for holding identification information that identifies opened structured storages in a computer system that supports structured storages and streams. Identification information about a selected structured storage is added to the transaction table when the selected structured storage is initially opened. Upon the last close of a structured storage by a last transaction that had the structured storage open, identification information about the structured storage is removed from the transaction table. Upon user data recovery, the system reads the transaction table to identify which structured storages need to be examined to complete user data recovery.

BRIEF DESCRIPTION OF THE DRAWINGS

A preferred embodiment of the present invention will be described in detail below relative to the following figures.

DETAILED DESCRIPTION OF THE PREFERRED EMBODIMENTS

The preferred embodiment of the present invention provides an approach to transaction processing of user data that combines features from write-ahead logging and shadow copying. In addition, the preferred embodiment adds new features. The preferred embodiment of the present invention provides transaction processing for user data rather than strictly for metadata (as in NTFS). The preferred embodiment of the present invention makes shadow copies of streams rather than structured storages (as in Microsoft® OLE) so as to decrease the amount of memory required to maintain the shadow copies. Hence, the preferred embodiment of the present invention strikes a balance between a simple implementation and minimizing memory requirements.

As will be described in more detail below, the preferred embodiment of the present invention maintains a transaction table. When a structured storage is created or opened, the name of the structured storage is added to the transaction table. The name of the structured storage is not removed from the transaction table until the last close of the structured storage. This transaction table is used to perform recovery after a system failure. When a stream is opened in a write mode (i.e., a mode in which writing to the stream is permitted), an internal copy of the stream is made. Copies of streams are not made until the streams are opened in write mode in order to preserve storage space. Changes are made to a copy of the stream until the changes are committed. At the commit, the internal copy of the stream is renamed to the name of the original stream so as to incorporate the changes into the persistently stored copy of the stream and to ensure that the committed changes are reflected in future accesses to the stream. It should be appreciated that during a transaction committed on a structured storage, more than one stream may need to be renamed (or an internal stream name swapped with the original stream name) because the transaction can modify more than one stream before committing. These renames or swaps are metadata operations that need to be done as a single atomic transaction. As will be described in more detail below, the preferred embodiment of the present invention relies on a logging method for implementing metadata transactions. If any of the rename/swap operations fail, the transaction is aborted and the attempt to commit the transaction fails. All of the streams that have been renamed or swapped since the start of the transaction are undone as a result of the failure.

The preferred embodiment assumes that a single storage includes multiple streams and that the system does not include nested structured storages. Nevertheless, those skilled in the art will appreciate that the present invention may also be practiced with nested storages. The preferred embodiment of the present invention operates with the current NTFS file model that supports multiple streams in a single file.

Figure 7:
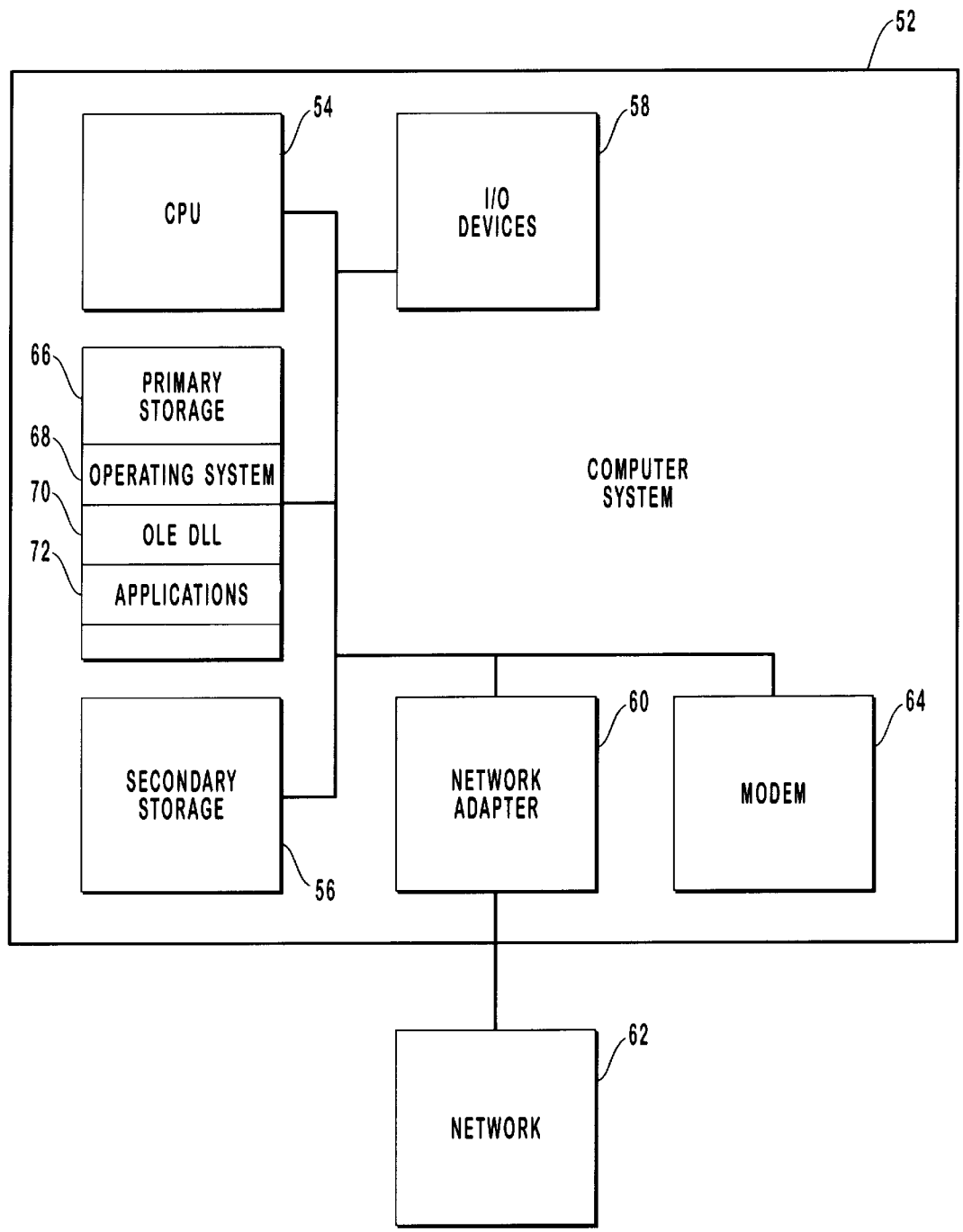
FIG. 7 is a flowchart of a computer system environment that is suitable for practicing the preferred embodiment to the present invention.

FIG. 7 is a block diagram of a computer system 52 that is suitable for practicing the preferred embodiment of the present invention. The computer system 52 includes a central processing unit (CPU) 54 that is accessed to a secondary storage 56, such as a hard disk drive, and one or more input/output (I/O) devices 58. The I/O devices 58 may include any of a number of different devices, including keyboards, mice, video displays, printers, pointing devices, audio loud speakers and digitizing tablets. The computer system 52 also includes a network adapter 60 for connecting the computer system 52 with a network 62, such as a local area network (LAN) or a wide area network (WAN). A modem 64 is provided to connect the computer system with telephone lines that may be used to access remote resources.

A primary storage 66 (such as internal RAM) holds a copy of an operating system 68, such as an embellished version of the Microsoft® Windows® NT, operating system, sold by Microsoft Corporation of Redmond, Wash. that has been embellished to support transaction processing of user data. Thus, the preferred embodiment of the present invention provides the transaction processing support for metadata that is found in NTFS. The primary storage 66 also holds a copy of the OLE dynamic link library (DLL) and provides support for utilizing Microsoft® OLE. One or more application programs 72 may also be stored in the primary storage 66. Support for transaction processing in the preferred embodiment of the present invention is provided primarily in the embellished operating system 68 and the OLE DLL 70.

Those skilled in the art will appreciate that the computer system depicted in FIG. 7 is intended to be merely illustrative and not limiting of the present invention. The present invention may be practiced with other computer system configurations including tightly coupled and loosely coupled multiple processor systems.

Figure 8:
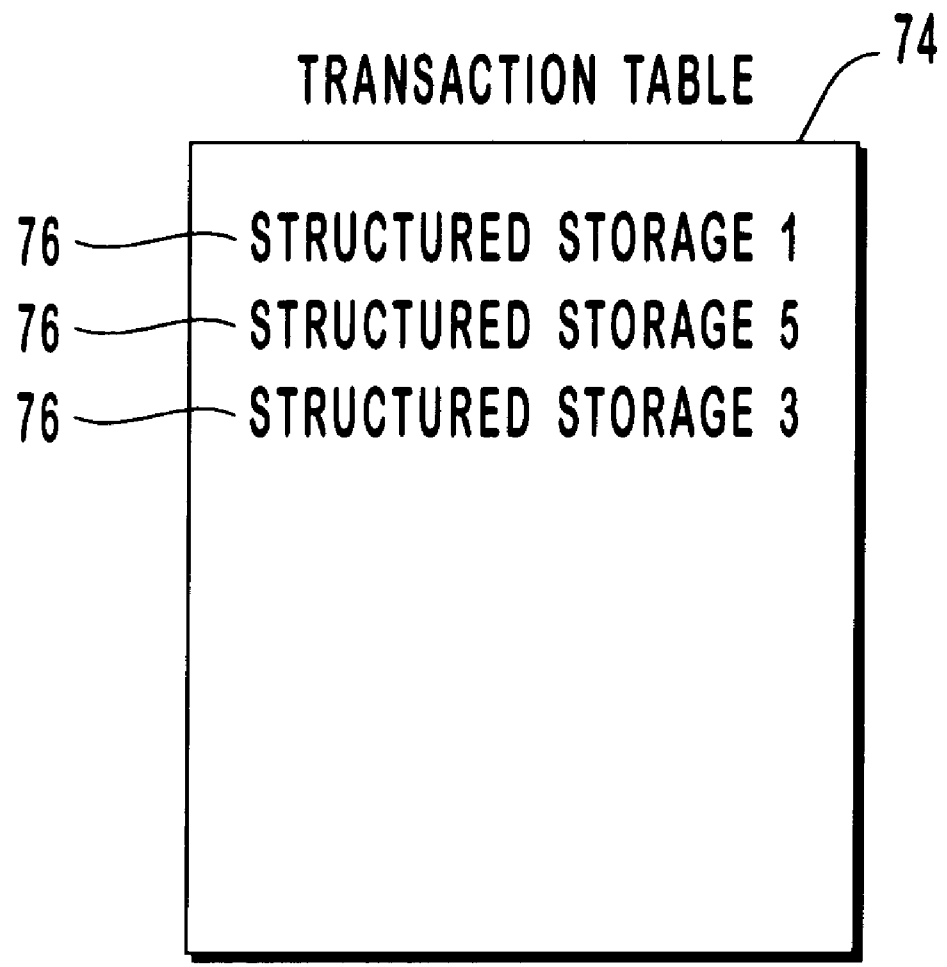
FIG. 8 illustrates the format of a transaction table in accordance with the preferred embodiment of the present invention.

As mentioned above, the preferred embodiment of the present invention supports Microsoft® OLE. As such, the preferred embodiment supports the use of structured storages like those described within the Background of the Invention. Each structured storage supports the IStorage interface and may hold one or more streams which support the IStream interface. Structured storages are supported in NTFS in files known as "docfiles". In order to monitor what structured storage is currently being utilized by transactions, the preferred embodiment of the present invention maintains a transaction table 74 like that depicted in FIG. 8. The transaction table 74 includes entries 76 that hold identification information (e.g., names) for each of the structured storages that are being manipulated by transactions. Each structured storage may hold multiple streams, and each transaction may modify multiple streams. As will be described in more detail below, this transaction table 74 is utilized on recovery to identify which structured storages may need to be processed to complete recovery.

Figure 9:
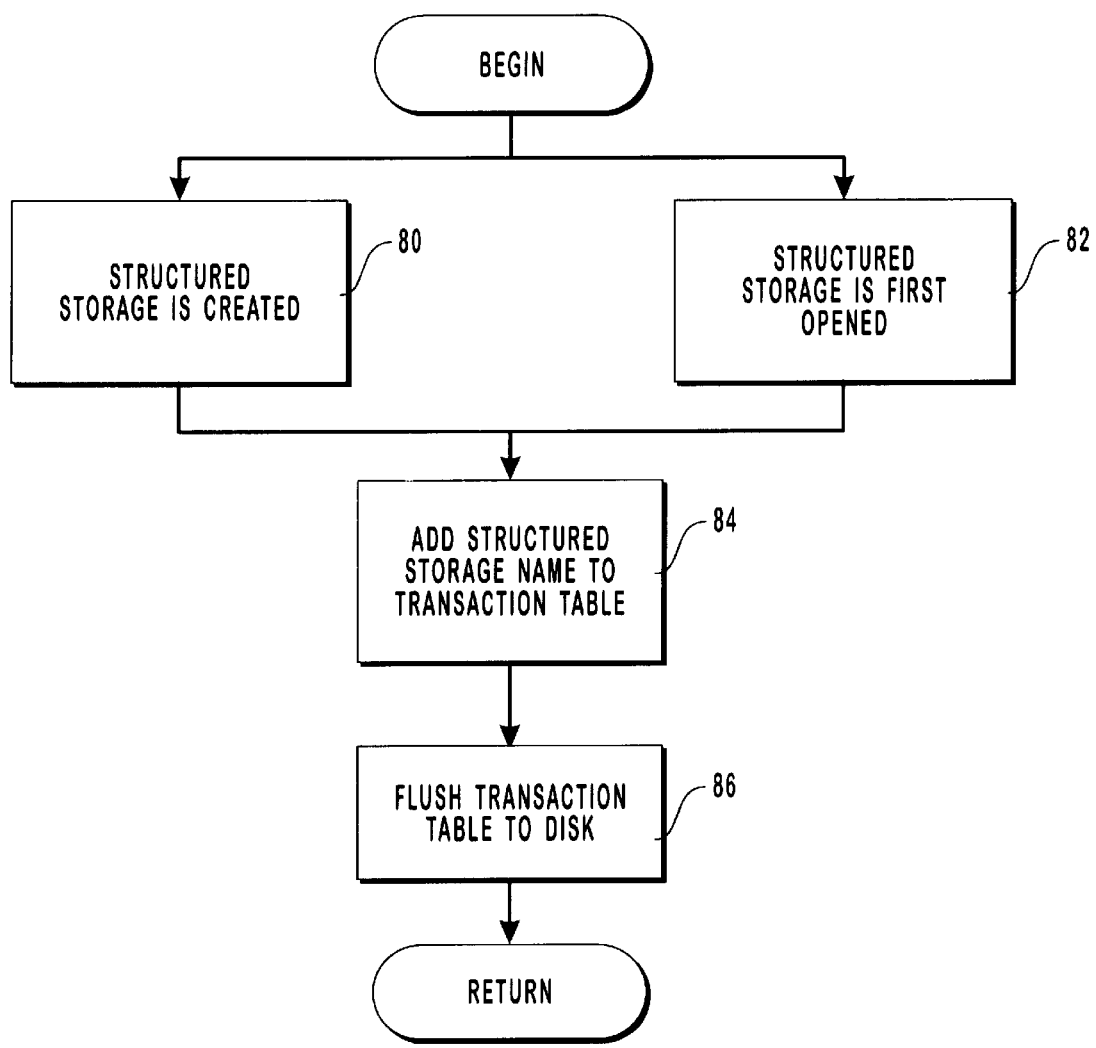
FIG. 9 is a flowchart that illustrates the steps that are performed to add a name of a structured storage to the transaction table.

FIG. 9 is a flowchart illustrating the steps that are performed to add structured storages to the transaction table 74. When a structured storage is created by a transaction (step 80 in FIG. 9), such as by calling the CreateStorage( ) function of the IStorage interface, or on the first open in write mode of a structured storage (step 82 in FIG. 9), such as by calling the OpenStorage( ) function of the IStorage interface, the name of the structured storage is added to the transaction table 74 (step 84 in FIG. 9). The transaction may be performed, for example, by one of the applications programs 72. By adding the name of the structured storage to the transaction table 74, the preferred embodiment of the present invention creates a list of each of the structured storages that may have been manipulated by transactions. Once the structured storage is added to the transaction table 74, the transaction table 74 is flushed to secondary storage 56, such as a disk (step 86 in FIG. 9). The flushing to the disk assures that a persistent copy of the transaction table is maintained each time that a change occurs at the transaction table. Hence, a current copy of the transaction table is ensured to be stored in persistent storage.

In a preferred embodiment of the present invention, two streams are used for serializing the transaction table. Two streams are utilized to avoid the situation where power failure occurs when the transaction table is being flushed to secondary storage. In such an instance the information of the transaction table may get corrupted. Hence, the preferred embodiment utilizes a ping-pong algorithm in which flushing to secondary storage alternates between the respective streams allocated for the transaction table. For example, if the last write of the transaction table was to reserved stream 1, then the next write of the transaction table would be to reserved stream 2 and the following write would be to reserved stream 1. As a result, if a failure occurs during the flushing, one of the reserve streams is guaranteed to have clean data for the transaction table.

Figure 10:
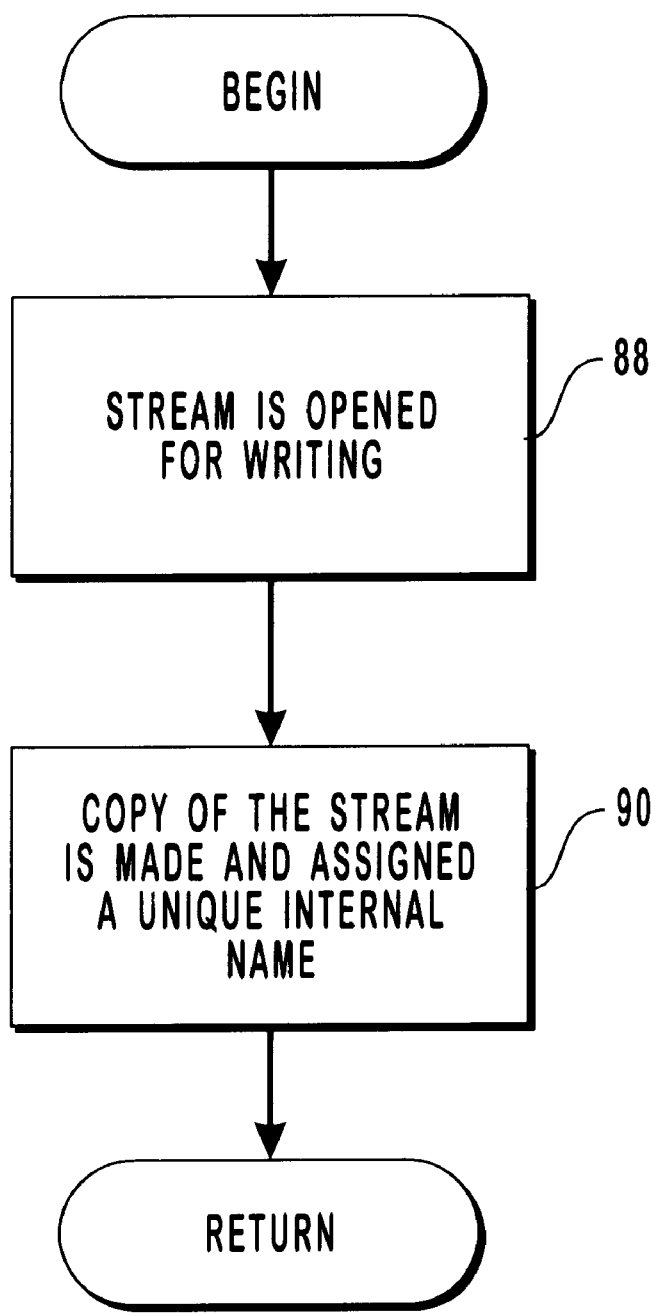
FIG. 10 is a flowchart illustrating the steps that are performed when a stream holding user data is opened in a write mode.

The preferred embodiment of the present invention makes shadow copies of streams when the streams are open in a write mode. Making shadow copies at the stream level of granularity helps to minimize the disk space that is occupied by such shadow copies. FIG. 10 is a flowchart illustrating the steps that are performed in making such copies of the streams. When a stream is opened for writing (step 88 in FIG. 10) such as when the Write( ) function of the IStream interface is called, a copy of the stream is made and is assigned a unique internal name (step 90 in FIG. 10). All changes are then made to the internal copy of the stream until the changes are committed.

Since structured storages in the preferred embodiment of the present invention support the IStorage interface, transactions of such structured storages may be committed by calling the Commit( ) function that is provided as part of that interface. The IStorage interface also supports the Revert( ) function that discards all changes made to the structured storage since the structured storage was opened or last committed.

Figure 11:
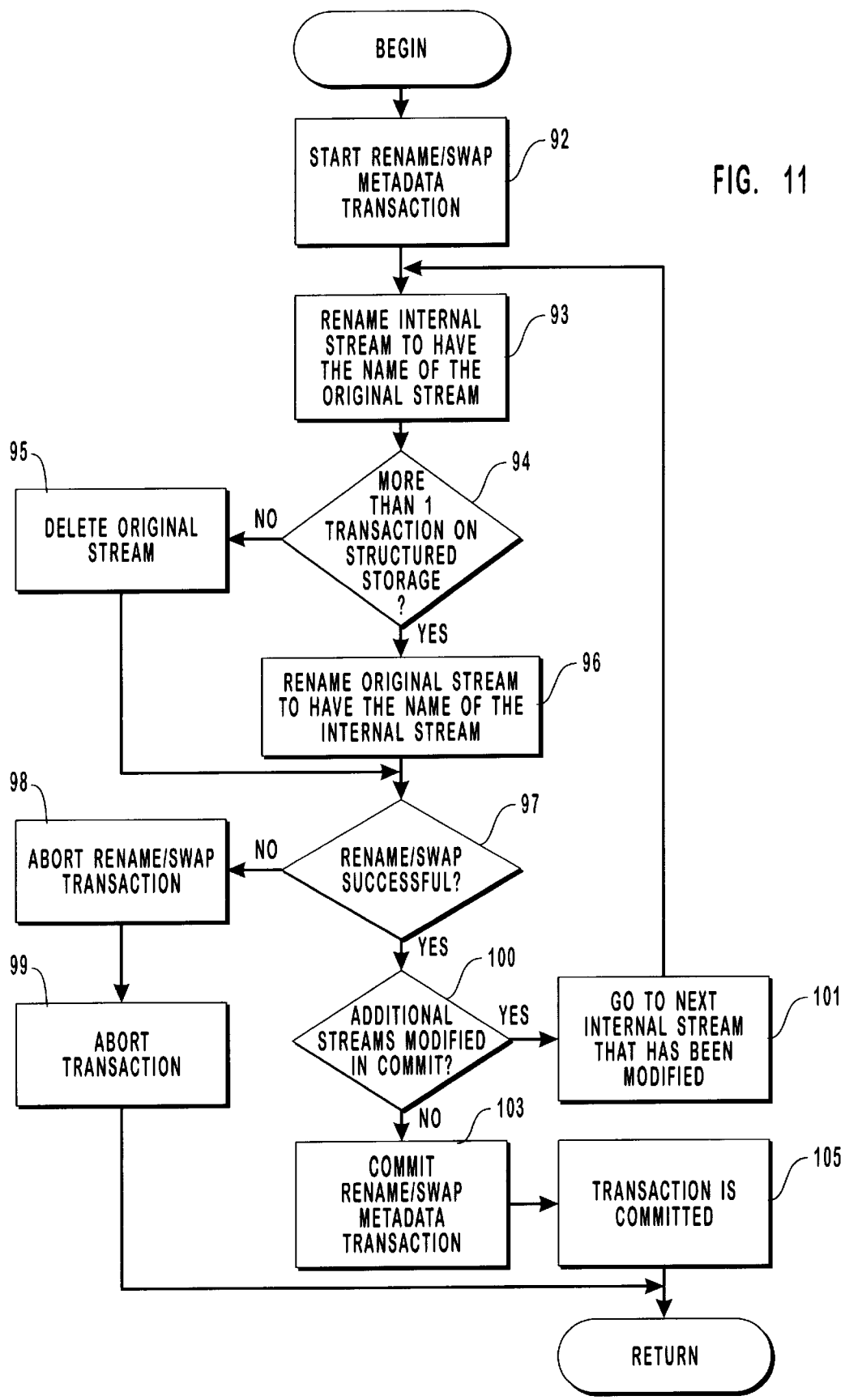
FIG. 11 is a flowchart illustrating the steps that are performed at the time that a transaction is committed.

FIG. 11 is a flowchart that shows the steps that are performed when a transaction is committed on a structured storage, such as by calling the Commit( ) function of the IStorage interface for the structured storage. Initially, the rename/swap metadata transaction is started (step 92 in FIG. 11). The internal shadow copy of the stream is renamed to have the name of the original stream (step 93 in FIG. 11).

The rename is a metadata transaction in Microsoft® Windows® NT and therefore, is guaranteed atomicity. The next steps that are performed depend on whether one or more transaction is currently on the structured storage (i.e., how many transactions have opened or created the structured storage). Hence, in step 94 it is determined whether there are more than one transaction on the structured storage. If there is only a single transaction on the structured storage, then the original stream is deleted (step 95 in FIG. 11). However, if there is more than one transaction on the structured storage, the original stream is renamed to have the name of the internal stream (step 96 in FIG. 11). This renaming assures that the other transactions see the appropriate data in the stream.

The steps the system performs depend upon whether the rename/swap metadata, transaction is successful or not (see step 97 in FIG. 11). If the rename/swap metadata transaction is not successful, it is aborted (step 98 in FIG. 11) and the overall transaction is aborted as well (step 99 in FIG. 11). On the other hand, it is determined whether there is an additional stream modified in the commit (step 100 in FIG. 11). If there is an additional stream that has been modified, the system goes to the next internal stream that has been modified (step 101 in FIG. 11) and repeats the above-described process beginning at step 93. If there are no other streams that have been modified and the rename/swap operations are successful, the rename/swap metadata transaction is committed (step 103 in FIG. 11), and the larger transaction is committed as well (step 105 in FIG. 11).

Figure 1:
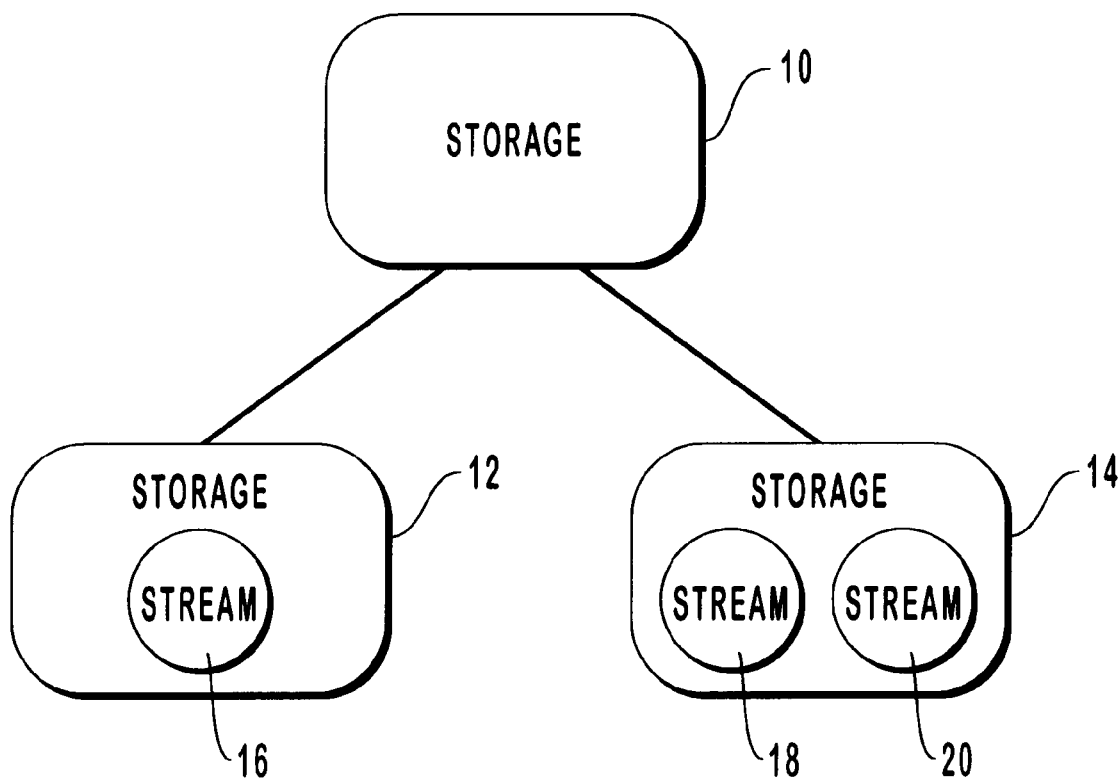
FIG. 1 is a block diagram illustrating an example of a hierarchy of structured storages in a conventional system that supports Microsoft® OLE.
Figure 2:
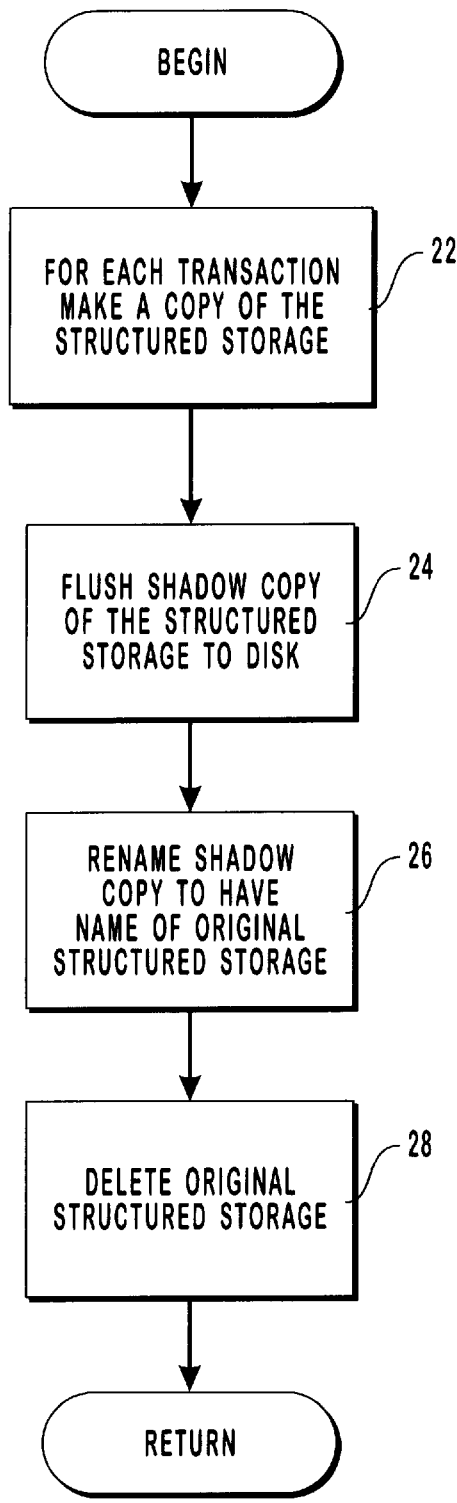
FIG. 2 is a flowchart illustrating the steps that are performed to support a transaction access mode in a conventional system that supports Microsoft® OLE.
Figure 3:
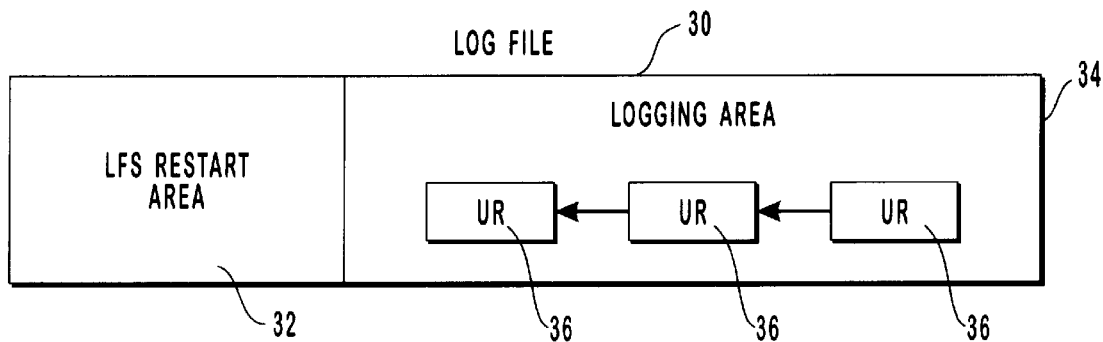
FIG. 3 is a block diagram illustrating the format of the log file in a conventional system that supports NTFS.
Figure 4:
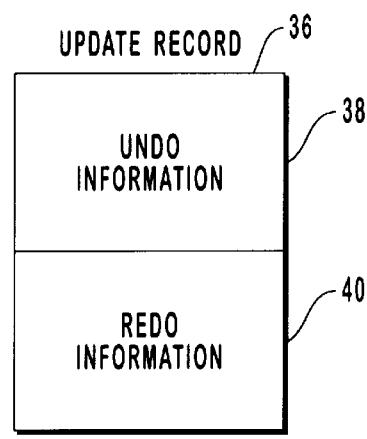
FIG. 4 is a block diagram illustrating the format of an update record as used in NTFS.
Figure 5:
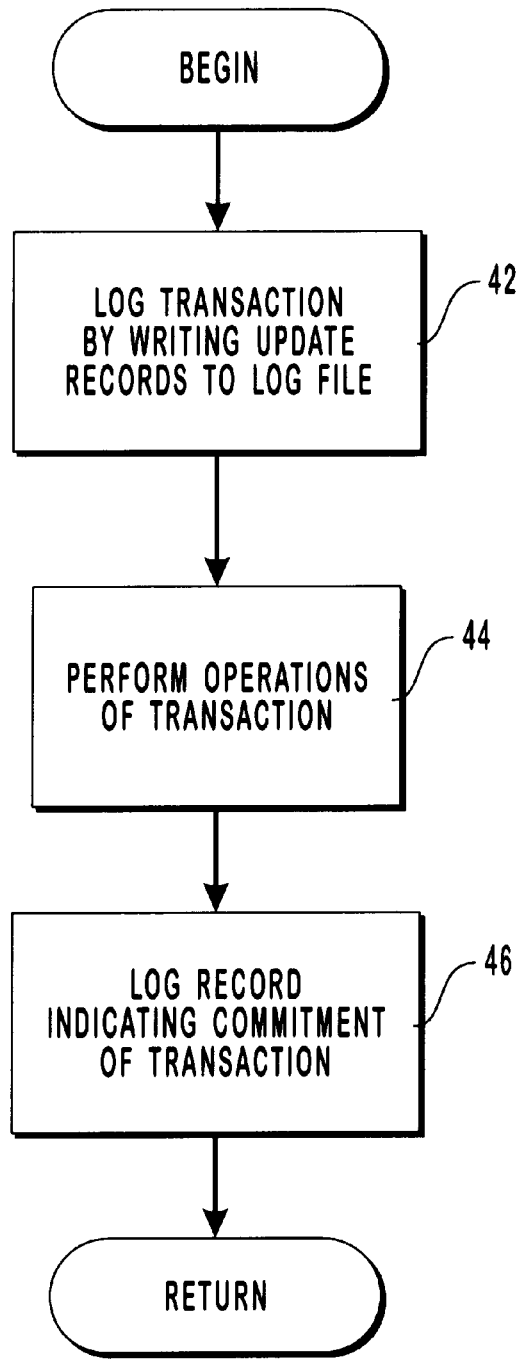
FIG. 5 is a flowchart illustrating the steps that are performed by a conventional system that supports NTFS to support transaction processing of metadata.
Figure 6:
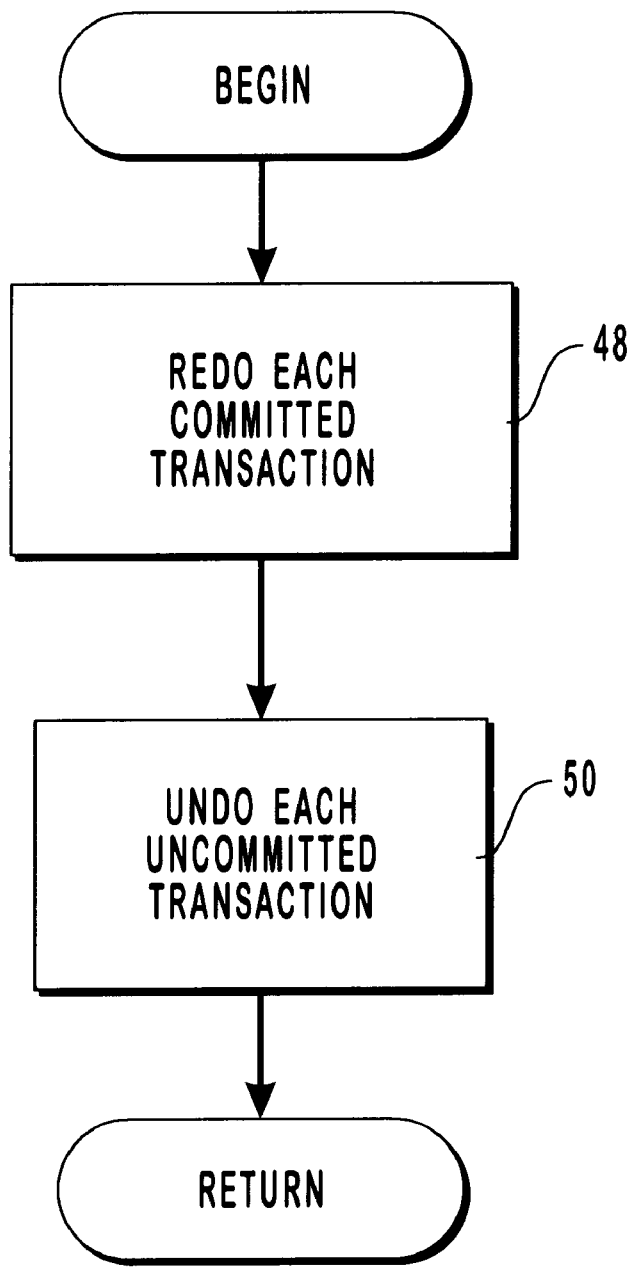
FIG. 6 is a flowchart of the steps that are performed by a conventional system that supports NTFS during metadata recovery.
Figure 12:
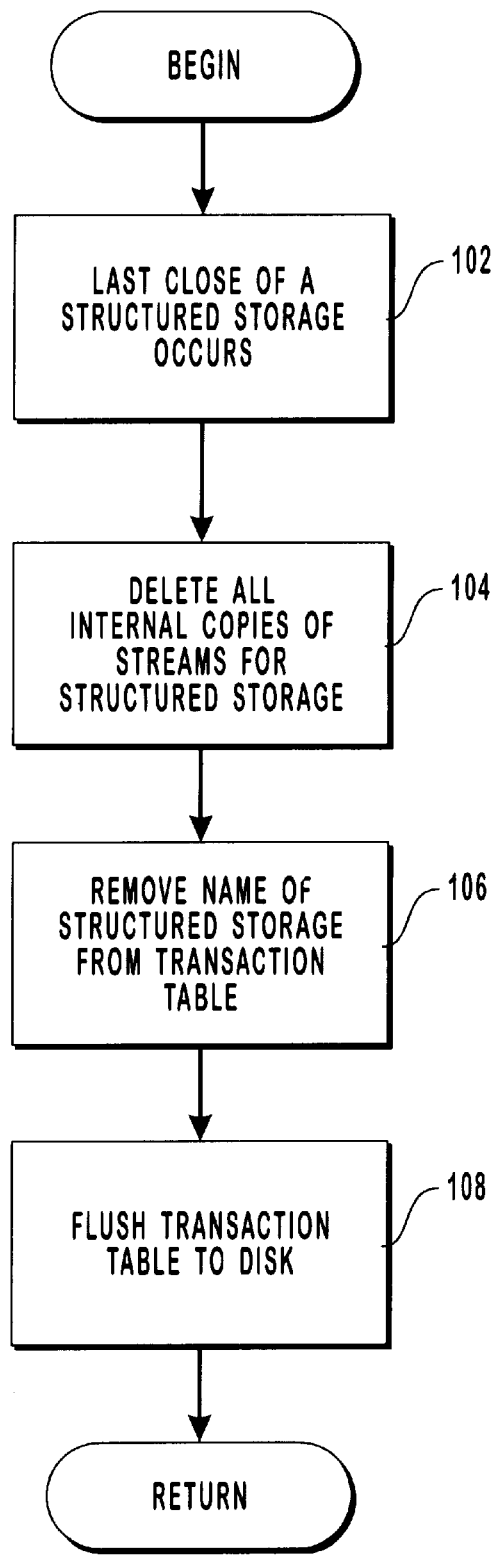
FIG. 12 is a flowchart illustrating the steps that are performed upon the last close of a structured storage.

The streams and the transaction table 74 must be updated when a transaction is done with a structured storage. FIG. 12 is a flowchart that illustrates the steps that occur when transactions are no longer using a structured storage. First, the last close of a structured storage occurs (i.e., all of the transactions on the structured storage have closed the structured storage) and the Release( ) function of IStorage is called (step 102 in FIG. 12). Given that the last close of the structured storage has occurred, it is assumed that all of the updates made to streams were either committed or purposefully left uncommitted. Thus, all internal copies of streams for the structured storage are deleted (step 104 in FIG. 12). Further, since the system knows that all of the changes to streams within the structured storage have either been committed or reverted, the system knows that it may remove the name of the structured storage from the transaction table (step 106 in FIG. 2). Given that the transaction table 74 has changed, the transaction table is then flushed to disk to keep the persistent copy of the table current (step 108 in FIG. 12).

Figure 13:
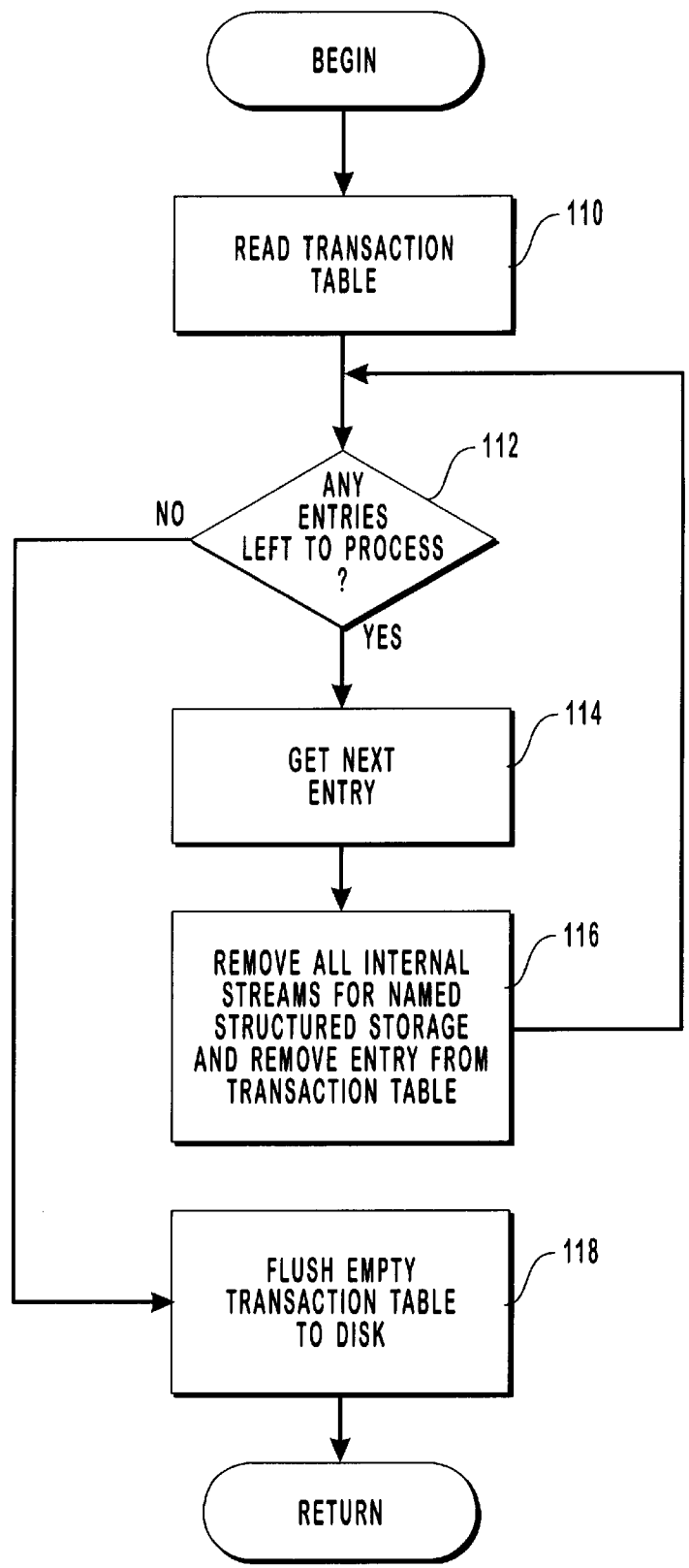
FIG. 13 is a flowchart illustrating the steps that are performed upon user data recovery.

Recovery begins with recovery for rename/swap metadata transactions. Since the rename/swap metadata transactions are implemented using the logging mechanism of NTFS, the recovery procedure is like that described within the Background of the Invention for the NTFS system. The metadata transaction recovery ensures that if a crash occurs midway through a series of renames/swaps, then all of the renames/swaps that were partially done will be undone. Recovery then proceeds to perform recovery for user data transactions. FIG. 13 shows the steps that are performed for user data recovery. The operating system 68 includes code for performing user data transaction recovery. Initially, this code reads the transaction table 74 from secondary storage 56 (step 110 in FIG. 13). The code then iteratively goes through each of the entries in the transaction table 74 (see steps 112 and 114 in FIG. 13). For each structured storage listed within the transaction table 74, all internal shadow copies of streams in the structured storage are deleted. Any internal copies of streams that remain were not committed when the system shut down. As such, the system does not wish to maintain those copies of the streams but rather wishes to remove them. The name of the structured storage is then removed from the transaction table 74 (step 116 in FIG. 13). This process is repeated until all of the entries are processed, at which time, the empty transaction table 74 is flushed to secondary storage 56 (step 118 in FIG. 13).

Figure 14A:
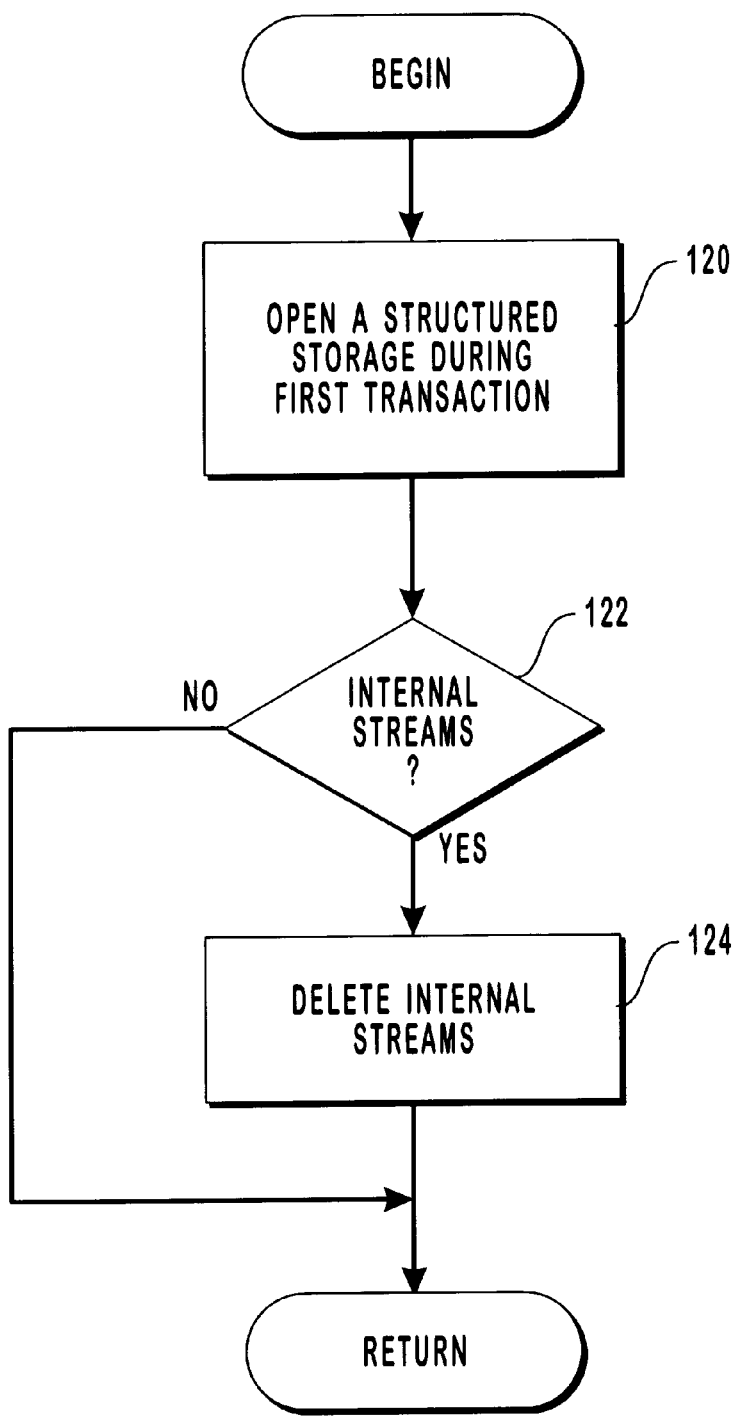
FIG. 14A is a flowchart illustrating the steps that are performed in an alternative embodiment in which internal streams are deleted upon the opening of a structured storage.

In a first alternative embodiment of the present invention, a transaction table is not maintained and internal streams and structured storages are not deleted at boot time because there is not a user data recovery mechanism that is executed during boot time. Instead, the internal streams are cleaned up in a lazy fashion. FIG. 14A depicts the steps that are performed in this first alternative embodiment to clean up the streams. First, a structured storage is opened and a first transaction begins on the structured storage (step 120 in FIG. 14A). It is then determined whether there are any internal streams remaining within the structured storage that need to be cleaned up (step 122 in FIG. 14A). If there are any internal streams remaining, they are deleted (step 124 in FIG. 14A). This approach has the benefit that it does not need to maintain the transaction table and does not need to continuously flush the transaction table, resulting in fewer flushes. On the other hand, each time that a structured storage is opened, it must be determined whether there are internal streams to be deleted or not and extra storage is not immediately recovered.

Figure 14B:
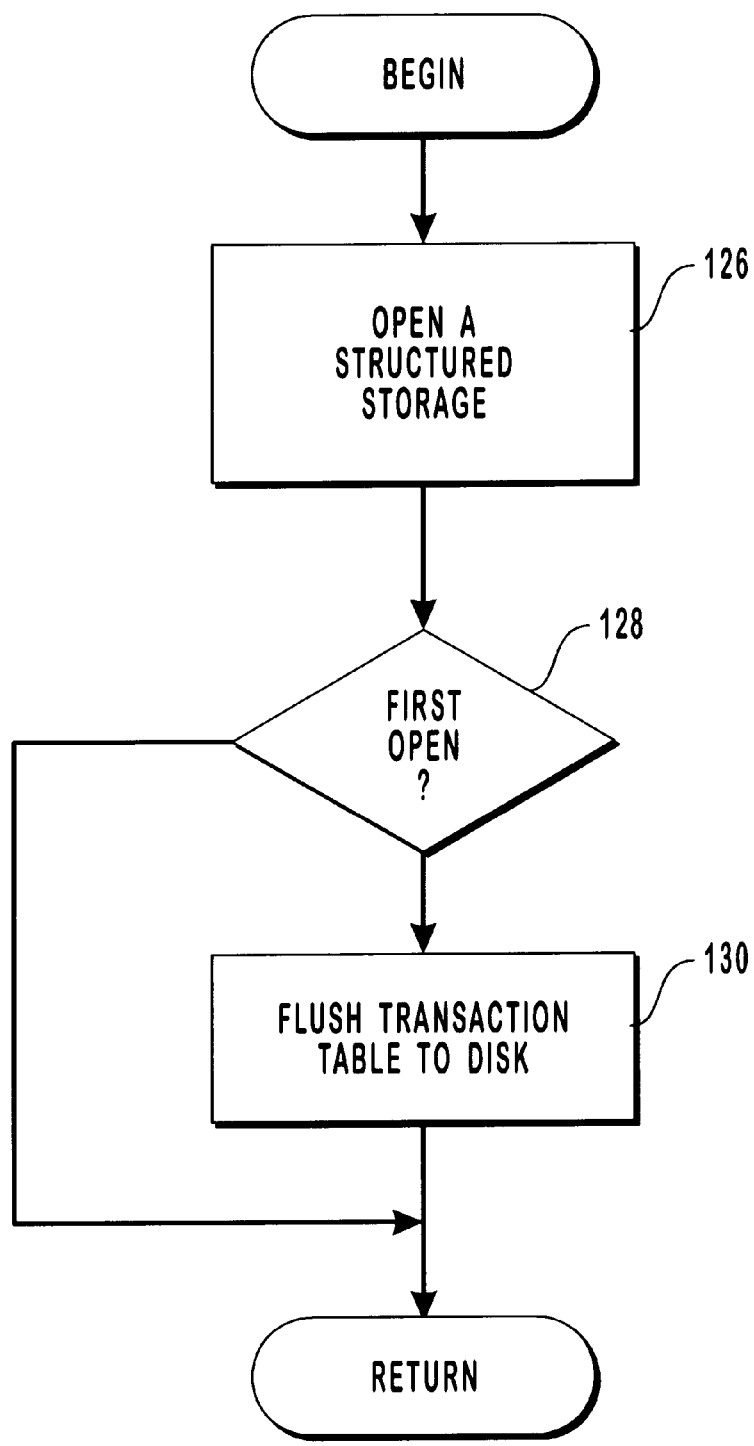
FIG. 14B is a flowchart illustrating the steps that are performed in an alternative embodiment in which a transaction table is flushed to disk upon the first open of a structured storage.
Figure 14C:
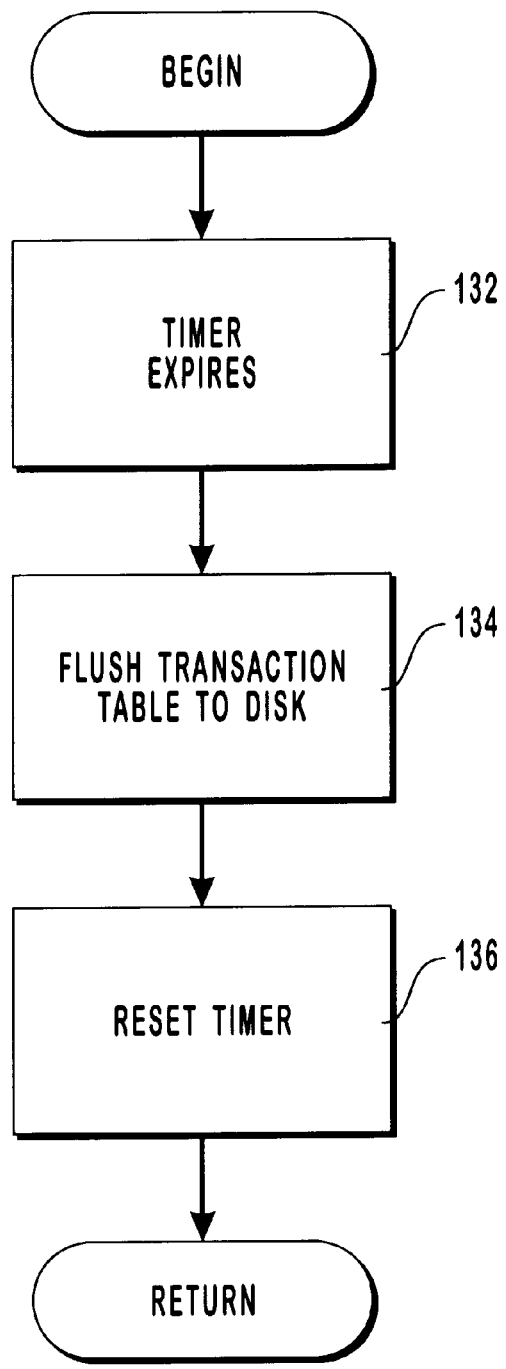
FIG. 14C is a flowchart illustrating the steps that are performed in an alternative embodiment where the transaction table is flushed to disk at periodic intervals.

The present invention also supports alternative mechanisms for when the transaction table is flushed to disk. FIG. 14B depicts a first alternative. When a structured storage is opened (step 126 in FIG. 14B), it is determined whether it is the first opening of the structured storage (step 128 in FIG. 14B). If it is the first opening of the structured storage, the transaction table is flushed to disk (step 130 in FIG. 14B). In a second alternative, the transaction table is flushed at periodic time intervals. As shown in FIG. 14C, a timer or counter expires that designates the time frame at which the transaction table is to be flushed to secondary storage (step 132 in FIG. 14C). The transaction table is then flushed to disk (step 134 in FIG. 14C) and the timer is reset to the next time period (e.g., one hour) (step 136 in FIG. 14C).

Figure 14D:
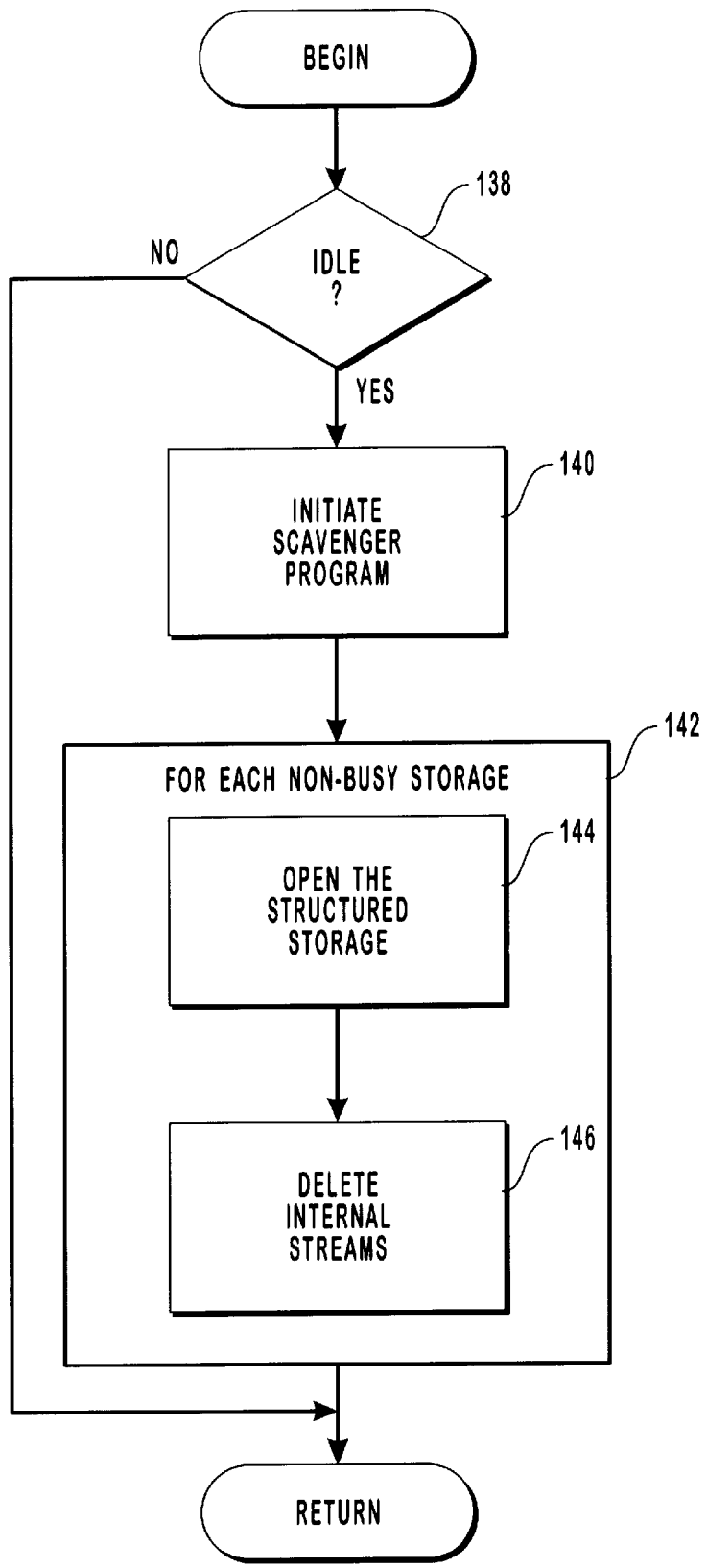
FIG. 14D is a flowchart illustrating the steps that are performed in an alternative embodiment in which a scavenger program runs during idle processor times to delete internal streams.

In another alternative implementation, the internal streams are not deleted during the recovery process but rather a scavenger program is utilized to delete the internal programs during idle times. FIG. 14D is a flowchart that illustrates the steps in such an alternative embodiment. First, the system checks whether or not it is idle (step 138 in FIG. 14D). When the system is idle, the scavenger program is initiated (step 140 in FIG. 14D). The scavenger program then performs the steps depicted within box 142 for each structured storage that does not have any in-progress transactions on it until it is interrupted or told to stop executing. Structured storages that have in-progress transactions are left alone. In particular, the scavenger program opens each successive structured storage (step 144 in FIG. 14D) and deletes any internal streams in the structured storage (step 146 in FIG. 14D). This approach has the benefits of not adding time to the boot process and more fully utilizing the system during idle times.

Figure 15:
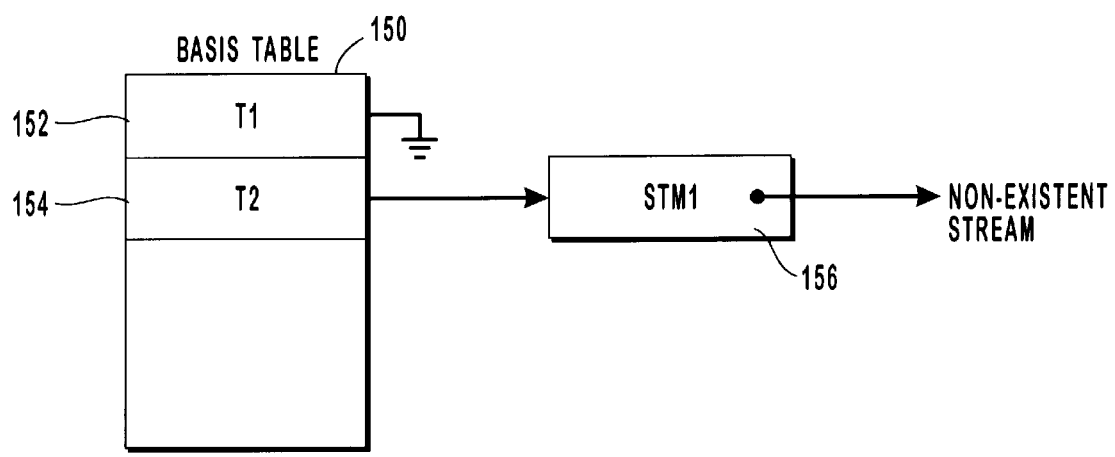
FIG. 15 depicts an example of the basis table used in the preferred embodiment of the present invention.

One of the complications that occurs in the preferred embodiment of the present invention is that multiple transactions may act upon a common stream. Each of the transactions may need to look at a different copy of the stream. In order to facilitate the transactions accessing appropriate copies of streams, the preferred embodiment of the present invention provides a basis table 150 such as depicted in FIG. 15. The basis table tells each transaction what copy of the stream it should utilize. If a transaction should simply use an original stream, no entry will be included. FIG. 15 depicts the appearances of the basis table 150 after transactions T1 and T2 have opened a common structure storage. Transaction T1 has added a stream "stream 1" to the structured storage and has committed the addition of the stream to the structured storage. Transaction T2 then tries to open stream 1. The basis table 150 includes an entry 152 for T1 and an entry 154 for T2. Each of these entries serves as the head of a chain of basis entries. Entry 152 does not have any basis entries attached to its chain. Entry 154 for transaction T2 however has an entry 156 for stream 1. This entry tells transaction T2 that for its purposes, stream 1 is a nonexistent stream and prevents transaction T2 from opening stream 1. Such basis table entries may also specify that transactions should use the internal copy of the stream rather than the original copy of the stream in some instances.

While the present invention has been described with reference to a preferred embodiment thereof, those skilled in the art will appreciate that various changes in form and detail may be made without departing from the intended scope of the present invention, as defined in the appended claims.

We claim:

1. In a computer system that includes a volatile primary storage and a persistent secondary storage, the computer system supporting transaction processing of user data using shadow copying, a method of removing shadow copies from the persistent secondary storage as part of a recovery from a failure, comprising the steps of:

providing a logical organization of objects, the logical organization being logically divided into named partitions with each partition being capable of holding one or more objects that contain user data;

providing a transaction table, stored in the persistent secondary storage, for holding names of partitions that have been opened by transactions;

opening selected partitions for writing by transactions, a shadow copy of at least one object held by each of the selected partitions being generated in the persistent secondary storage;

adding a name of each of the selected partitions to the transaction table in response to the selected partitions being opened;

performing a last close on at least one, but not all, of the selected partitions;

removing the name of each of said at least one of the selected partitions in response to said at least one of the selected partitions being closed; and recovering from a failure, including deleting any shadow copies of the at least one object of the selected partitions whose names remain in the transaction table.

2. A method as recited in claim 1 wherein the partitions are structured storages.

3. A method as recited in claim 2 wherein at least one of the structured storages includes one or more streams, wherein the step of opening the selected partitions comprises the step of opening said one or more streams by a single transaction.

4. A method as recited in claim 2 wherein the objects that contain user data are steams.

5. A method as recited in claim 1 wherein the step of adding the name of each of the selected partitions to the transaction table comprises the steps of:

adding the name of at least one of the selected partitions to a copy of the transaction table stored in the volatile primary storage; and flushing the copy of the transaction table to the persistent secondary storage so as to store the transaction table in the persistent secondary storage.

6. A method as recited in claim 1 further comprising the step of flushing to the persistent secondary storage a copy of the transaction stored in the volatile primary storage so as to store the transaction table in the persistent secondary storage each time that a name is added to the transaction table and each time that a name is removed from the transaction table.

7. A method as recited in claim 1 wherein:

the step of opening selected partitions for writing by transactions comprises the step of opening for a first time the selected partitions for writing; and the step of adding the names of the selected partitions is conducted in response to the selected transactions being opened for the first time and comprises the step of flushing to the persistent secondary storage a copy of the transaction stored in the volatile primary storage so as to store the transaction table in the persistent secondary storage.

8. A method as recited in claim 1 further comprising flushing to the persistent secondary storage a copy of the transaction table stored in the volatile primary storage at periodic intervals so as to store the transaction table in the persistent secondary storage.

9. A method as recited in claim 1, wherein deleting said any shadow copies comprises the steps of:

reading the transaction table from the persistent secondary storage;

identifying the selected partitions whose names remain in the transaction table; and deleting said any shadow copies based on the step of identifying the selected partitions.

10. In a computer system that includes a volatile primary storage and a persistent secondary storage, the computer system supporting structured storages, streams, and transaction processing of user data stored in the streams using shadow copying, a method of removing shadow copies from the persistent secondary storage as part of a recovery from a failure, the method comprising the steps of:

providing a transaction table, stored in the persistent secondary storage, for holding information that identifies structured storages opened for writing as part of a transaction;

initially opening selected structured storages for writing as part of a transaction;

generating in the persistent secondary storage a shadow copy of at least one stream included in each of the selected structured storages;

for each of the selected structured storages, adding to the transaction table information identifying the particular selected structured storage in response to the particular selected structured storage having been initially opened for writing as part of a transaction;

performing a last close on at least some, but not all, of the selected structured storages;

for each of said at least some of the selected structured storages, removing from the transaction table the information identifying the particular selected structured storage in response to the last close having been performed on the particular selected structured storage; and recovering from a failure, including deleting any shadow copies of the at least one stream included in the selected structured storages whose identifying information remains in the transaction table.

11. A method as recited in claim 10 further comprising the step of flushing to the persistent secondary storage a copy of the transaction table stored in the volatile primary storage each time that the information identifying a structured storage is added to the transaction table and each time that information identifying a structured storage is removed from the transaction table.

12. A method as recited in claim 9 further comprising the step of flushing to the persistent secondary storage a copy of the transaction table stored in the volatile primary storage at periodic time intervals so at to store the transaction table in the persistent secondary storage.

13. A method as recited in claim 10 further comprising the step of opening multiple streams for writing as part of a transaction, a shadow copy of each of the multiple streams being generated in the persistent secondary storage.

14. A method as recited in claim 9 further comprising the step of opening a single stream for writing as part of multiple transactions, multiple shadow copies of the single stream being generated in the persistent secondary storage, one of the multiple shadow copies being generated for each of the multiple transactions.

15. A method as recited in claim 14 further comprising the step of using a basis table to inform each of the multiple transactions which of the multiple shadow copies of the single stream to use.

16. A method as recited in claim 10 wherein deleting said any shadow copies comprises the steps of:

reading the transaction table from the persistent secondary storage;

identifying the selected structured storages whose identifying information remains in the transaction table; and deleting said any shadow copies based on the step of identifying the selected structured storages.

17. In a computing environment that includes a volatile primary storage and a persistent secondary storage, the computer environment supporting transaction processing of user data using shadow copying, a system for removing shadow copies from the persistent secondary storage as part of a recovery from a failure, comprising:

processor means for performing the steps of:

providing a logical organization of objects, the logical organization being logically divided into named partitions with each partition being capable of holding one or more objects that contain user data;

providing a transaction table, stored in the persistent secondary storage, for holding names of partitions that have been opened by transactions;

opening selected partitions for writing by transactions, a shadow copy of at least one object held by each of the selected partitions being generated in the persistent secondary storage;

adding a name of each of the selected partitions to the transaction table in response to the selected partitions being opened;

performing a last close on at least one, but not all, of the selected partitions;

removing the name of each of said at least one of the selected partitions in response to said at least one of the selected partitions being closed; and recovering from a failure, including deleting any shadow copies of the at least one object of the selected partitions whose names remain in the transaction table.

18. A system as recited in claim 17 wherein the partitions are structured storages that may include one or more streams holding user data, wherein each of the one or more streams can be simultaneously opened by a single transaction.

19. A system as recited in claim 17 wherein the system comprises means for flushing to the persistent secondary storage a copy of the transaction table stored at the volatile primary storage so as to store the transaction table in the persistent secondary storage.

20. A system as recited in claim 17, wherein deleting said any shadow copies comprises the steps of:
   reading the transaction table from the persistent secondary storage;
   identifying the selected partitions whose names remain in the transaction table; and
   deleting said any shadow copies based on the step of identifying the selected partitions.

21. In a computing environment that includes a volatile primary storage and a persistent secondary storage, the computer system supporting structured storages, streams, and transaction processing of user data stored in the streams using shadow copying, a system for removing shadow copies from the persistent secondary storage as part of a recovery from a failure, comprising:
   processor means for performing the steps of:
      providing a transaction table, stored in the persistent secondary storage, for holding information that identifies structured storages opened for writing as part of a transaction;
      initially opening selected structured storages for writing as part of a transaction;
      generating in the persistent secondary storage a shadow copy of at least one stream included in each of the selected structured storages;
      for each of the selected structured storages, adding to the transaction table information identifying the particular selected structured storage in response to the particular selected structured storage having been initially opened for writing as part of a transaction;
      performing a last close on at least some, but not all, of the selected structured storages;
      for each of said at least some of the selected structured storages, removing from the transaction table the information identifying the particular selected structured storage in response to the last close having been performed on the particular selected structured storage; and
      recovering from a failure, including deleting any shadow copies of the at least one stream included in the selected structured storages whose identifying information remains in the transaction table.

22. A system as recited in claim 21 wherein the system comprises means for flushing to the persistent secondary storage a copy of the transaction table so as to store the transaction table in the persistent secondary storage.

23. A system as recited in claim 21 further comprising:
   means for opening a single stream for writing as part of multiple transactions, multiple shadow copies of the single stream being generated in the persistent secondary storage, one of the multiple shadow copies being generated for each of the multiple transactions; and
   a computer-readable medium having stored thereon a basis table that is used to inform each of the multiple transactions which of the multiple shadow copies of the single stream to use.

24. A system as recited in claim 21 wherein deleting said any shadow copies comprises the steps of:
   reading the transaction table from the persistent secondary storage;
   identifying the selected structured storages whose identifying information remains in the transaction table; and
   deleting said any shadow copies based on the step of identifying the selected structured storages.

25. A computer program product for implementing, in a computer system that includes a volatile primary storage and a persistent secondary storage, the computer system supporting transaction processing of user data using shadow copying, a method of removing shadow copies from the persistent secondary storage as part of a recovery from a failure, the computer program product comprising:
   a computer-readable medium carrying computer-executable instructions for implementing the method wherein the computer-executable instructions comprise:
      program code means for providing a logical organization of objects, the logical organization being logically divided into named partitions with each partition being capable of holding one or more objects that contain user data;
      program code means for providing a transaction table, stored in the persistent secondary storage, for holding names of partitions that have been opened by transactions;
      program code means for opening selected partitions for writing by transactions, a shadow copy of at least one object held by each of the selected partitions being generated in the persistent secondary storage;
      program code means for adding a name of each of the selected partitions to the transaction table in response to the selected partitions being opened;
      program code means for performing a last close on at least one, but not all, of the selected partitions;
      program code means for removing the name of each of said at least one of the selected partitions in response to said at least one of the selected partitions being closed; and
      program code means for recovering from a failure, including program code means for deleting any shadow copies of the at least one object of the selected partitions whose names remain in the transaction table.

26. A computer program product as recited in claim 25 wherein the partitions are structured storages that may include one or more streams holding user data, wherein each of the one or more streams can be simultaneously opened by a single transaction.

27. A computer program product as recited in claim 25 wherein the computer-executable instructions further comprise program code means for flushing to the persistent secondary storage a copy of the transaction table stored at the volatile primary storage so as to store the transaction table in the persistent secondary storage.

28. A computer program product as recited in claim 25 wherein the computer-executable instructions further comprise:
   means for opening a single partition for writing as part of multiple transactions, multiple shadow copies of at least one object held by the single partition being generated in the persistent secondary storage, one of the multiple shadow copies being generated for each of the multiple transactions; and
   program code means for using a basis table to inform each of the multiple transactions which of the multiple shadow copies to use.

29. A computer program product as recited in claim 25 wherein the program code means for deleting said any shadow copies further comprise:
   program code means for reading the transaction table from the persistent secondary storage;
   program code means for identifying the selected partitions whose names remain in the transaction table; and
   program code means for deleting said any shadow copies based on the selected partitions identified by the program code means for identifying.

* * * * *

UNITED STATES PATENT AND TRADEMARK OFFICE
CERTIFICATE OF CORRECTION

PATENT NO. : 6,078,999
DATED : June 20, 2000
INVENTOR(S) : Sitaram C. V. Raju; Kyle G. Peltonen It is certified that error appears in the above-identified patent and that said Letters Patent is hereby corrected as shown below:

Column 3,
Line 2, before "data" change "is," to -- is --

Column 10,
Line 3, after "the" change "appearances" to -- appearance --

Column 12,
Line 6, after "claim" change "9" to -- 10 --
Line 9, after "so" change "at" to -- as --
Line 15, change "9" to -- 10 --

Signed and Sealed this

Ninth Day of October, 2001

Attest:

*Nicholas P. Godici*

NICHOLAS P. GODICI
*Attesting Officer*    *Acting Director of the United States Patent and Trademark Office*